US009819394B2

United States Patent
Shana'a et al.

(10) Patent No.: US 9,819,394 B2
(45) Date of Patent: Nov. 14, 2017

(54) METHOD FOR CONTROLLING AN ANTENNA NETWORK QUALITY FACTOR OF A NEAR FIELD COMMUNICATION DEVICE WITHOUT CHANGING MATCHING NETWORK, AND ASSOCIATED APPARATUS

(71) Applicant: MediaTek Singapore Pte. Ltd., Singapore (SG)

(72) Inventors: Osama K A Shana'a, Singapore (SG); Ying Chow Tan, Singapore (SG); Chee-Lee Heng, Singapore (SG)

(73) Assignee: MEDIATEX Singapore Pte. Ltd., Solaris (SG)

( * ) Notice: Subject to any disclaimer, the term of this patent is extended or adjusted under 35 U.S.C. 154(b) by 113 days.

(21) Appl. No.: 14/200,023

(22) Filed: Mar. 7, 2014

(65) Prior Publication Data

US 2014/0323043 A1 Oct. 30, 2014

Related U.S. Application Data

(60) Provisional application No. 61/816,949, filed on Apr. 29, 2013.

(51) Int. Cl.
*H04B 5/00* (2006.01)
(52) U.S. Cl.
CPC .................. *H04B 5/0031* (2013.01)
(58) Field of Classification Search
CPC ................... H04B 5/0031; H04B 5/0056–5/02
See application file for complete search history.

(56) References Cited

U.S. PATENT DOCUMENTS

| 6,972,662 B1 * | 12/2005 | Ohkawa | G06K 19/0723 340/10.1 |
| 7,783,254 B2 * | 8/2010 | Raggam | G06K 19/0723 340/10.1 |
| 2009/0153300 A1 * | 6/2009 | Meier | G06K 19/0723 340/10.1 |

(Continued)

FOREIGN PATENT DOCUMENTS

| CN | 101814154 A | 8/2010 |
| CN | 101937503 A | 1/2011 |
| CN | 101978383 A | 2/2011 |

*Primary Examiner* — Gennadiy Tsvey
(74) *Attorney, Agent, or Firm* — Wolf, Greenfield & Sacks, P.C.

(57) ABSTRACT

A method for controlling an antenna network quality factor of an NFC device includes: determining whether a first data rate or a second data rate should be used for data communication during different time intervals, respectively; and when it is determined that the first data rate should be used during a first time interval of the time intervals, controlling a set of internal resistors positioned within a chip of the NFC device to have a first configuration during the first time interval, in order to adjust the antenna network quality factor. More particularly, the method further includes: when it is determined that the second data rate should be used during a second time interval of the time intervals, controlling the set of internal resistors to have a second configuration during the second time interval, in order to adjust the antenna network quality factor. An associated apparatus is also provided.

32 Claims, 13 Drawing Sheets

(56) References Cited

U.S. PATENT DOCUMENTS

| | | | |
|---|---|---|---|
| 2010/0013321 A1* | 1/2010 | Onishi | G08C 17/04 |
| | | | 307/104 |
| 2010/0136911 A1* | 6/2010 | Sekita et al. | 455/41.2 |
| 2010/0248653 A1* | 9/2010 | Merlin | G06K 19/07749 |
| | | | 455/90.1 |
| 2010/0320962 A1* | 12/2010 | Sekita | H02J 7/025 |
| | | | 320/108 |
| 2010/0321128 A1* | 12/2010 | Merlin | G06K 7/0008 |
| | | | 333/112 |
| 2010/0328045 A1* | 12/2010 | Goto et al. | 340/10.4 |
| 2011/0028104 A1* | 2/2011 | Giombanco | H04L 25/0266 |
| | | | 455/78 |
| 2011/0043429 A1* | 2/2011 | Merlin | G06K 19/0723 |
| | | | 343/860 |
| 2011/0293039 A1* | 12/2011 | Tsushima | H04L 27/06 |
| | | | 375/296 |
| 2012/0242456 A1* | 9/2012 | Tsushima | G06K 19/0723 |
| | | | 340/10.1 |
| 2013/0115876 A1* | 5/2013 | McFarthing | 455/41.1 |

* cited by examiner

METHOD FOR CONTROLLING AN ANTENNA NETWORK QUALITY FACTOR OF A NEAR FIELD COMMUNICATION DEVICE WITHOUT CHANGING MATCHING NETWORK, AND ASSOCIATED APPARATUS

CROSS REFERENCE TO RELATED APPLICATIONS

This application claims the benefit of U.S. Provisional Application No. 61/816,949, which was filed on Apr. 29, 2013, and is included herein by reference.

BACKGROUND

The present invention relates to dynamic quality factor (Q) tuning without changing the antenna matching network in an electronic device, and more particularly, to a method for controlling an antenna network quality factor of a near field communication (NFC) device, and to an associated apparatus.

According to the related art, a conventional NFC device can be designed to communicate using a predetermined data rate, where it is typically needed to make sure of a proper value of the antenna network quality factor (or the so-called Q) in a design phase of the conventional NFC device. Tuning the antenna network quality factor to be smaller (e.g. a low Q) is needed for high data rate communication, while tuning the antenna network quality factor to be greater (e.g. a high Q) is preferred for low data rate communication. In a situation where the conventional NFC device should be capable of communicating using different data rates, respectively, quality factor tuning (or Q-tuning) is required. However, some problems may occur. For example, the antenna matching network of the conventional NFC device is typically equipped with additional components on a printed circuit board (PCB) of the conventional NFC device for setting a fixed Q value to make the conventional NFC device be suitable for communicating using different data rates, respectively. As a result, the tradeoff between the size of the conventional NFC device and the capability of respectively communicating using different data rates is typically introduced, since the size of the conventional NFC device corresponds to the total amount of components on the PCB. In another example, although the antenna matching network can be carefully designed by developers in the design phase of the conventional NFC device, because of the fixed characteristics of the additional components, the tradeoff between the performance of high data rate communication and the performance of low data rate communication is typically introduced. More particularly, in order to provide the conventional NFC device with the capability of operating in the absence of battery power through harvesting energy from the incoming field, tuning the antenna network quality factor to be greater (e.g. a high Q) is also needed. Although the matching network can be carefully designed by developers in the design phase of the conventional NFC device, because of the fixed characteristics of the additional components, the tradeoff between the performance of high data rate communication (which may be performed in a situation where the battery power is available) and the efficiency of harvesting energy from the incoming field is typically introduced. Thus, a novel method is required for improving the data transmission performance of all data rates of the NFC device at the same time.

SUMMARY

It is an objective of the claimed invention to provide a method for controlling an antenna network quality factor of a near field communication (NFC) device, and to an associated apparatus, in order to solve the above-mentioned problems.

It is another objective of the claimed invention to provide a method for controlling an antenna network quality factor of an NFC device, and to an associated apparatus, in order to perform dynamic quality factor (Q) tuning without changing the antenna matching network in the NFC device.

According to at least one preferred embodiment, a method for controlling an antenna network quality factor of an NFC device is provided, where the method comprises: determining whether a first data rate or a second data rate should be used for data communication during different time intervals, respectively, wherein the first data rate is different from the second data rate; and when it is determined that the first data rate should be used for data communication during a first time interval of the time intervals, controlling a set of internal resistors positioned within a chip of the NFC device to have a first configuration during the first time interval, in order to adjust the antenna network quality factor. More particularly, the method further comprises: when it is determined that the second data rate should be used for data communication during a second time interval of the time intervals, controlling the set of internal resistors to have a second configuration during the second time interval, in order to adjust the antenna network quality factor.

According to at least one preferred embodiment, an apparatus for controlling an antenna network quality factor of an NFC device is provided, where the apparatus comprises at least one portion of the NFC device. The apparatus comprises a set of internal resistors and a control circuit, where the set of internal resistors and the control circuit are positioned within a chip of the NFC device, and the control circuit is coupled to the set of internal resistors. The set of internal resistors is arranged to perform antenna network quality factor control. In addition, the control circuit is arranged to determine whether a first data rate or a second data rate should be used for data communication during different time intervals, respectively, wherein the first data rate is different from the second data rate. Additionally, when it is determined that the first data rate should be used for data communication during a first time interval of the time intervals, the control circuit controls the set of internal resistors to have a first configuration during the first time interval, in order to adjust the antenna network quality factor. More particularly, when it is determined that the second data rate should be used for data communication during a second time interval of the time intervals, the control circuit controls the set of internal resistors to have a second configuration during the second time interval, in order to adjust the antenna network quality factor.

It is an advantage of the present invention that the present invention method and apparatus can dynamically tune the antenna network quality factor without changing the antenna matching network in the NFC device. In addition, in comparison to the related art, the present invention method and apparatus can reduce the related costs since the number of external components outside the chip is less than that of the conventional NFC device. Additionally, as the antenna network quality factor tuning of the present invention method and apparatus can be performed adaptively, the performance for each data rate can be optimized.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . .". Also, the term "couple" is intended to mean either an indirect or direct electrical connection. Accordingly, if one device is coupled to another device, that connection may be through a direct electrical connection, or through an indirect electrical connection via other devices and connections.

Figure 1:
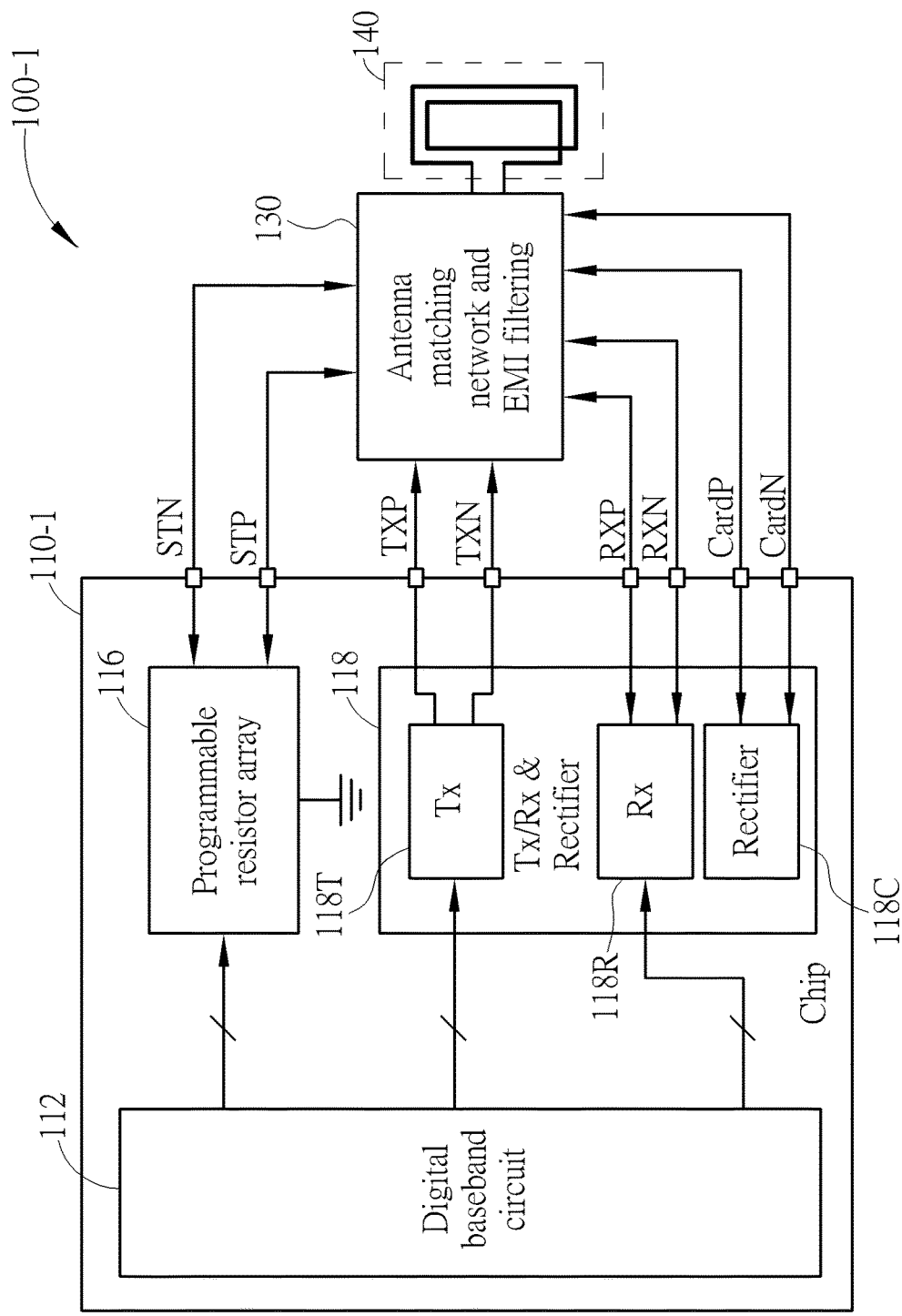
FIG. 1 is a diagram of an apparatus for controlling an antenna network quality factor of a near field communication (NFC) device according to a first embodiment of the present invention.

Please refer to FIG. 1, which illustrates a diagram of an apparatus 100-1 for controlling an antenna network quality factor of a near field communication (NFC) device according to a first embodiment of the present invention, where the apparatus 100-1 may comprise at least one portion (e.g. a portion or all) of the NFC device. For example, the apparatus 100-1 may comprise a portion of the NFC device mentioned above, and more particularly, can be at least one hardware circuit such as at least one integrated circuit (IC) within the electronic device. In another example, the apparatus 100-1 can be the whole of the NFC device mentioned above. In another example, the apparatus 100-1 may comprise an NFC system comprising the NFC device mentioned above.

As shown in FIG. 1, the apparatus 100-1 may comprise a chip 110-1, which can be taken as an example of the aforementioned at least one IC, and may further comprise an antenna matching network and electromagnetic interference (EMI) filtering module 130 (labeled "Antenna matching network and EMI filtering" in FIG. 1, for brevity) and an NFC antenna 140, where the antenna matching network and EMI filtering module 130 may comprise an antenna matching network and an EMI filter (which are not illustrated, for brevity). In practice, the EMI filter mentioned above can be implemented with some impedance components (e.g. one or more inductors and/or one or more capacitors, in this embodiment), and the antenna matching network mentioned above can be implemented with some impedance components (e.g. one or more inductors and/or one or more capacitors, in this embodiment). In addition, the chip 110-1 may comprise a control circuit such as a digital baseband circuit 112, and may further comprise a programmable resistor array 116, whose resistors therein can be implemented by using physical resistors or by using transistors configured to behave like resistors. For example, these transistors can be Metal Oxide Semiconductor Field Effect Transistors (MOSFETs). Additionally, the chip 110-1 may further comprise a transceiver and rectifier module 118 (labeled "Tx/Rx & Rectifier" in FIG. 1, for brevity). For example, the transceiver and rectifier module 118 may comprise a transmitter 118T (labeled "Tx" in FIG. 1, for brevity), a receiver 118R (labeled "Rx" in FIG. 1, for brevity), and a rectifier 118C. As shown in FIG. 1, the transmitter 118T can be coupled to a set of transmitter terminals TXP and TXN of the chip 110-1, where the transmitter 118T is arranged to transmit data for the NFC device through the set of transmitter terminals TXP and TXN, the antenna matching network and EMI filtering module 130, and the NFC antenna 140. The receiver 118R can be coupled to a set of receiver terminals RXP and RXN of the chip 110-1, where the receiver 118R is arranged to receive data for the NFC device through the set of receiver terminals RXP and RXN, the antenna matching network and EMI filtering module 130, and the NFC antenna 140. The rectifier 118C can be coupled to a set of card terminals CardP and CardN of the chip 110-1, where the rectifier 118C is arranged to perform rectifying operations for the NFC device through the set of card terminals CardP and CardN. Please note that the programmable resistor array 116 of this embodiment is positioned outside the transceiver and rectifier module 118, and can be coupled to another set of terminals, such as the set of stand-alone terminals STP and STN of the chip 110-1, rather than being coupled to any set of the set of transmitter terminals TXP and TXN, the set of receiver terminals RXP and RXN, and the set of card terminals CardP and CardN. This is for illustrative purposes only, and is not meant to be a limitation of the present invention. According to some variations of this embodiment, such as the embodiments respectively shown in FIGS. 2-4, a portion of the architecture shown in FIG. 1 can be varied.

Figure 2:
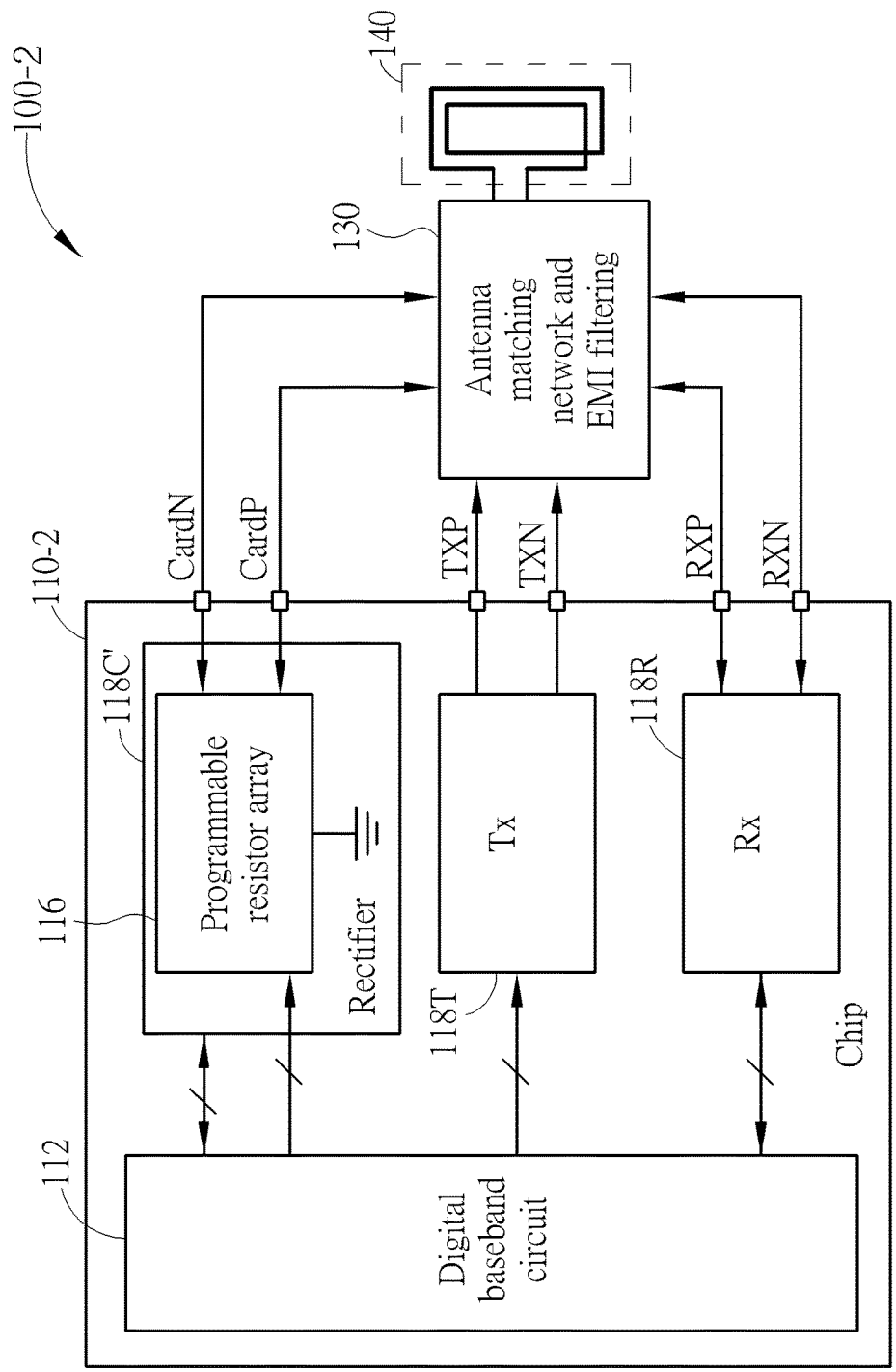
FIG. 2 is a diagram of an apparatus for controlling an antenna network quality factor of an NFC device according to a second embodiment of the present invention.

FIG. 2 is a diagram of an apparatus 100-2 for controlling an antenna network quality factor of an NFC device according to a second embodiment of the present invention, where this embodiment is a variation of the embodiment shown in FIG. 1. In comparison with the apparatus 100-1 shown in FIG. 1, the programmable resistor array 116 of this embodiment is integrated into the rectifier mentioned above. In response to the change in the architecture, the rectifier that comprises the programmable resistor array 116 in this embodiment can be referred to as the rectifier 118C', and the chip of this embodiment can be referred to as the chip 110-2. In addition, the programmable resistor array 116 can be coupled to the set of card terminals CardP and CardN. For brevity, similar descriptions for this embodiment are not repeated in detail here.

Figure 3:
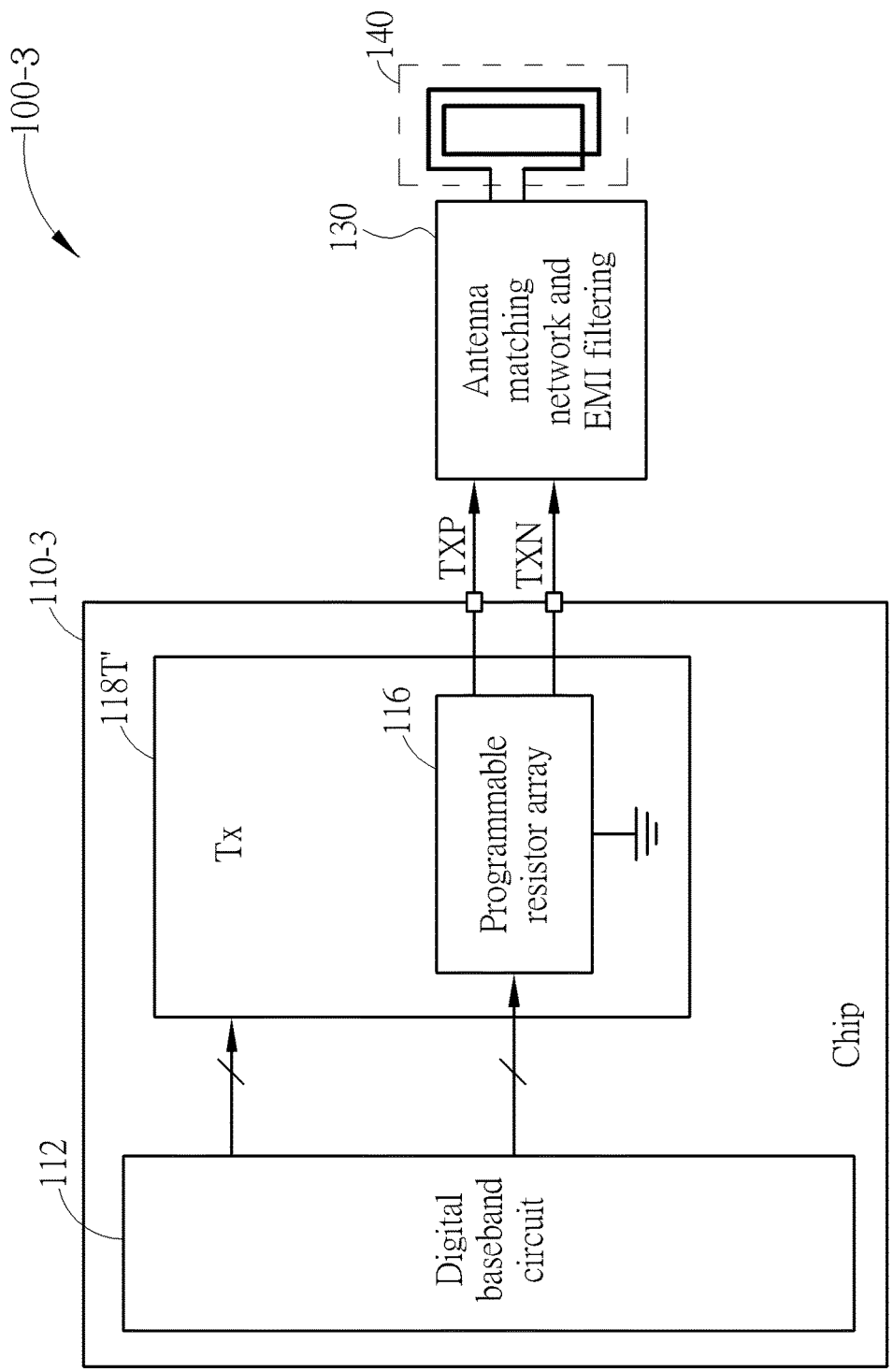
FIG. 3 is a diagram of an apparatus for controlling an antenna network quality factor of an NFC device according to a third embodiment of the present invention.

FIG. 3 is a diagram of an apparatus 100-3 for controlling an antenna network quality factor of an NFC device according to a third embodiment of the present invention, where this embodiment is a variation of the embodiment shown in FIG. 1. In comparison with the apparatus 100-1 shown in FIG. 1, the programmable resistor array 116 of this embodiment is integrated into the transmitter mentioned above. In response to the change in the architecture, the transmitter that comprises the programmable resistor array 116 in this embodiment can be referred to as the transmitter 118T', and the chip of this embodiment can be referred to as the chip 110-3. In addition, the programmable resistor array 116 can be coupled to the set of transmitter terminals TXP and TXN. For brevity, similar descriptions for this embodiment are not repeated in detail here.

Figure 4:
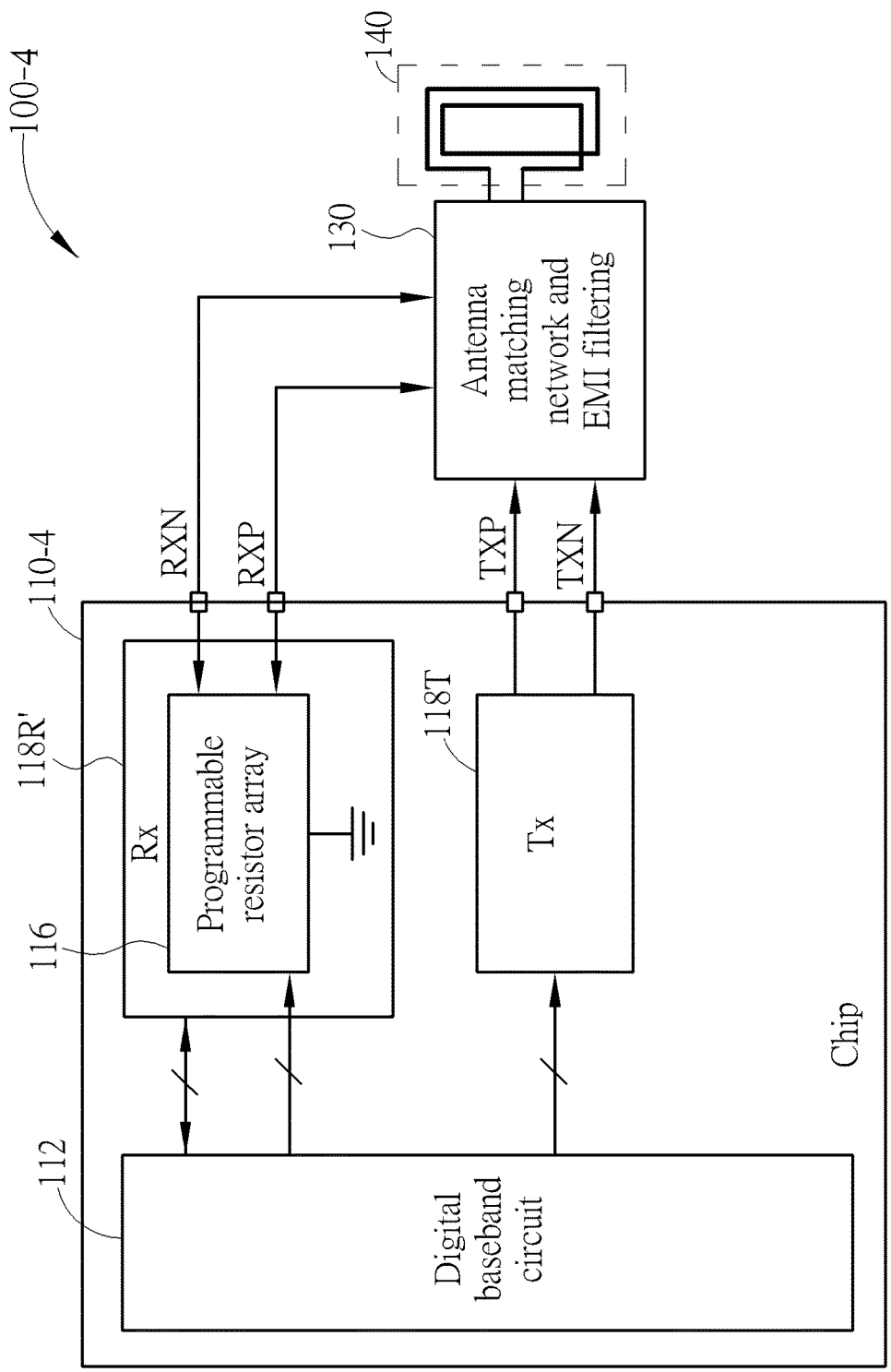
FIG. 4 is a diagram of an apparatus for controlling an antenna network quality factor of an NFC device according to a fourth embodiment of the present invention.

FIG. 4 is a diagram of an apparatus 100-4 for controlling an antenna network quality factor of an NFC device according to a fourth embodiment of the present invention, where this embodiment is a variation of the embodiment shown in FIG. 1. In comparison with the apparatus 100-1 shown in FIG. 1, the programmable resistor array 116 of this embodiment is integrated into the receiver mentioned above. In response to the change in the architecture, the receiver that comprises the programmable resistor array 116 in this embodiment can be referred to as the receiver 118R', and the chip of this embodiment can be referred to as the chip 110-4. In addition, the programmable resistor array 116 can be coupled to the set of receiver terminals RXP and RXN. For brevity, similar descriptions for this embodiment are not repeated in detail here.

Figure 5:
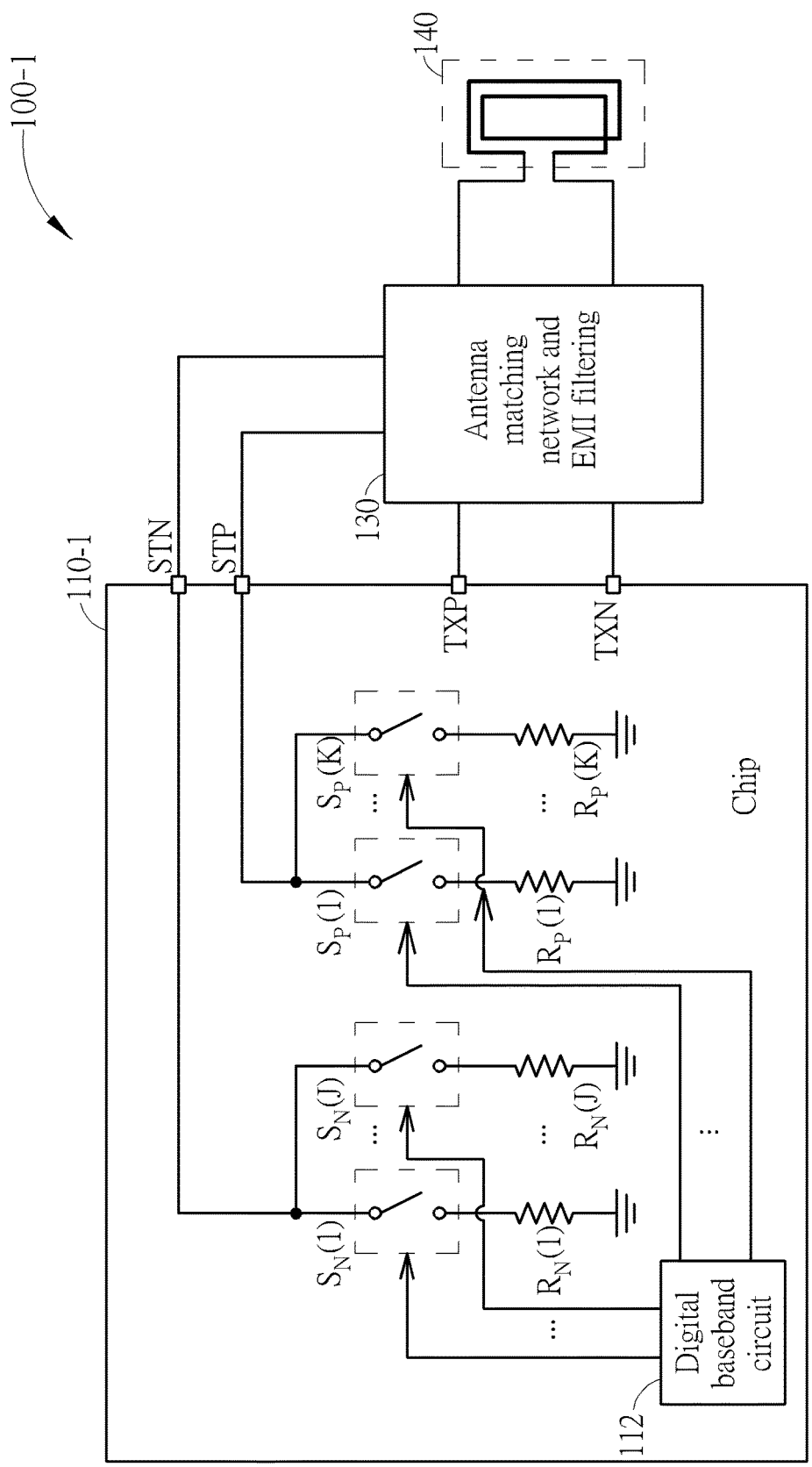
FIG. 5 illustrates some implementation details of the apparatus shown in FIG. 1 according to an embodiment of the present invention.

FIG. 5 illustrates some implementation details of the apparatus 100-1 shown in FIG. 1 according to an embodiment of the present invention. As shown in FIG. 5, the programmable resistor array 116 of this embodiment may comprise a plurality of switching units such as the switching units $\{S_N(j)\}$ and $\{S_P(k)\}$ with the indexes j and k being positive integers falling within the range of the interval [1, J] and the range of the interval [1, K], respectively, and a set of internal resistors of the chip 110-1, such as the internal resistors $\{R_N(j)\}$ and $\{R_P(k)\}$ with the indexes j and k being the aforementioned positive integers falling within the range of the interval [1, J] and the range of the interval [1, K], respectively, where the plurality of switching units such as the switching units $\{S_N(j)\}$ and $\{S_P(k)\}$ and the set of internal resistors such as the internal resistors $\{R_N(j)\}$ and $\{R_P(k)\}$ are internal components of the programmable resistor array 116 positioned within the chip 110-1 of the NFC device. For example, the notation J may represent a positive integer that is greater than one, and the notation K may represent a positive integer that is greater than one. In this embodiment, the digital baseband circuit 112, the switching units $\{S_N(j)\}$ and $\{S_P(k)\}$, and the internal resistors $\{R_N(j)\}$ and $\{R_P(k)\}$ are positioned within the chip 110-1 of the NFC device mentioned above, where the switching units $\{S_N(j)\}$ and $\{S_P(k)\}$ and the internal resistors $\{R_N(j)\}$ and $\{R_P(k)\}$ can be coupled to the antenna matching network and EMI filtering module 130 through the set of stand-alone terminals STN and STP of the chip 110-1.

According to this embodiment, the internal resistors $\{R_N(j)\}$ and $\{R_P(k)\}$ are arranged to perform antenna network quality factor control. In addition, the digital baseband circuit 112 is capable of determining whether tuning the antenna network quality factor to be smaller (e.g. a low Q, for high data rate communication) is needed or determining whether tuning the antenna network quality factor to be greater (e.g. a high Q, for low data rate communication, or for harvesting energy from an electromagnetic field generated by another device) is needed. According to whether tuning the antenna network quality factor to be smaller is needed or whether tuning the antenna network quality factor to be greater is needed, the digital baseband circuit 112 is capable of controlling the set of internal resistors such as the internal resistors $\{R_N(j)\}$ and $\{R_P(k)\}$ to have different configurations in different situations, respectively, in order to adaptively perform quality factor tuning (or Q-tuning) without changing the antenna matching network and EMI filtering module 130, and more particularly, to accomplish higher data rate without changing the antenna matching network and EMI filtering module 130. For example, when it is determined that tuning the antenna network quality factor to be greater (e.g. a high Q, for low data rate communication, or for harvesting energy from the electromagnetic field) is needed, the digital baseband circuit 112 may control the set of internal resistors such as the internal resistors $\{R_N(j)\}$ and $\{R_P(k)\}$ to have a first configuration during a first time interval, in order to adjust the antenna network quality factor to be suitable for low data rate communication or suitable for harvesting energy, without changing the antenna matching network and EMI filtering module 130. In another example, when it is determined that tuning the antenna network quality factor to be smaller (e.g. a low Q, for high data rate communication) is needed, the digital baseband circuit 112 may control the set of internal resistors to have a second configuration during a second time interval, in order to adjust the antenna network quality factor to be suitable for high data rate communication, without changing the antenna matching network and EMI filtering module 130. Typically, the second configuration is different from the first configuration.

In practice, under control of the aforementioned control circuit such as the digital baseband circuit 112, depending on the desired value of the antenna network quality factor, the correct number of resistors within the set of internal resistors can be coupled to the NFC antenna 140 through the associated sets of terminals of the chip 110-1, such as the set of card terminals CardN and CardP in this embodiment. A higher desired value of the antenna network quality factor can be achieved by coupling more internal resistors in parallel, and vice versa. In this way, the same NFC device can be configured to achieve the highest output power and the best performance when it is receiving data at 106 kbps, or configured to meet the falling time requirement when transmit data at 848 kbps. For related information, please refer to ISO/IEC 14443-2: 2010 and M. Gebhart, et al., "Automatic Analysis of 13.56 MHz Reader Command modulation pulses", Eurasip RFID Workshop 2008.

Figure 6:
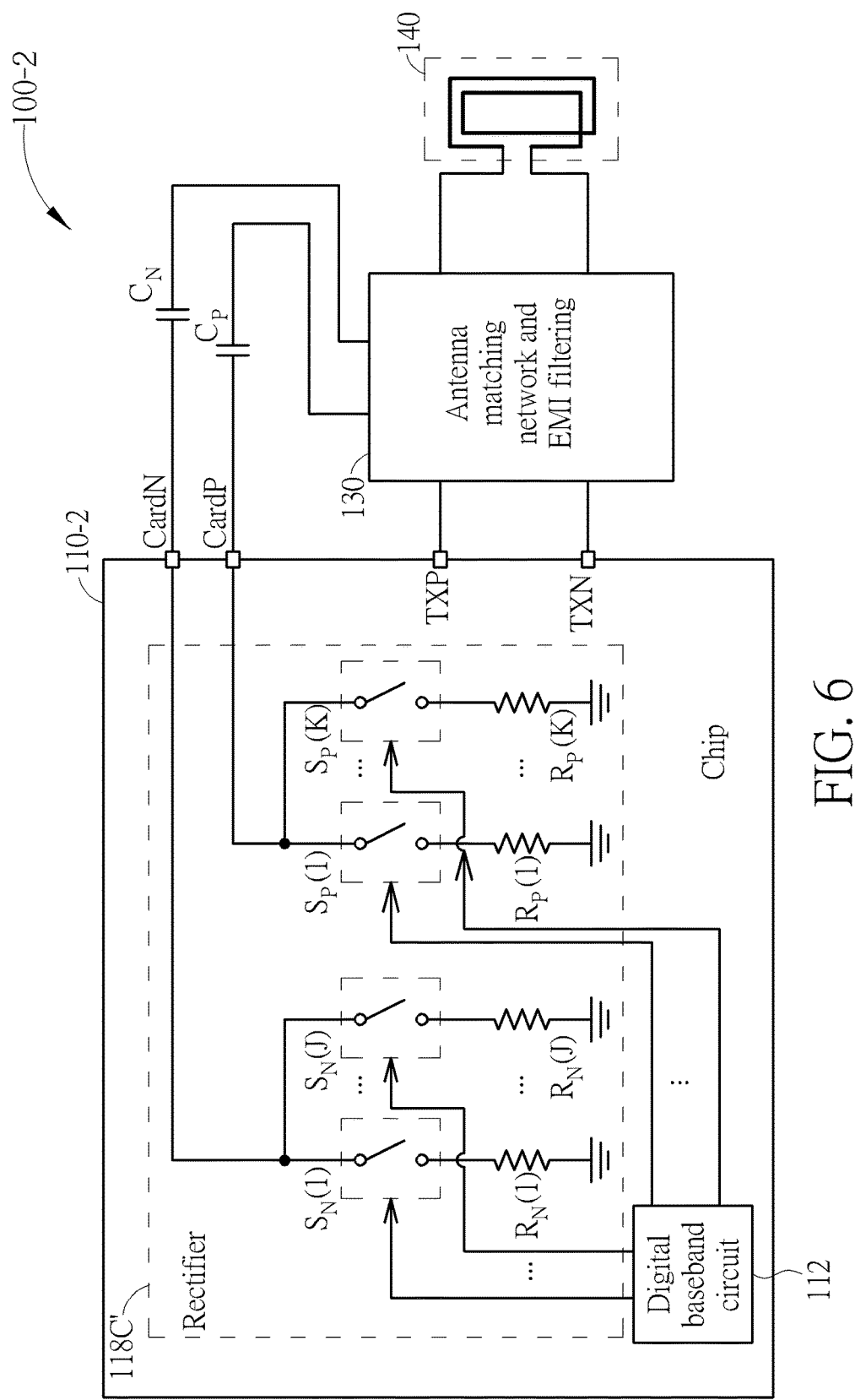
FIG. 6 illustrates some implementation details of the apparatus shown in FIG. 2 according to an embodiment of the present invention.

FIG. 6 illustrates some implementation details of the apparatus 100-2 shown in FIG. 2 according to an embodiment of the present invention, where this embodiment is a variation of the embodiment shown in FIG. 5. According to this embodiment, the plurality of switching units such as the switching units $\{S_N(j)\}$ and $\{S_P(k)\}$ and the set of internal resistors such as the internal resistors $\{R_N(j)\}$ and $\{R_P(k)\}$ can be positioned within the rectifier 118C' mentioned above. In addition, the switching units $\{S_N(j)\}$ and $\{S_P(k)\}$ and the internal resistors $\{R_N(j)\}$ and $\{R_P(k)\}$ can be coupled to the antenna matching network and EMI filtering module 130 through the set of card terminals CardN and CardP of the chip 110-2. In practice, in addition to the components within the antenna matching network and EMI filtering module 130, external components of the chip 110-2 (i.e. the components outside the chip 110-2 within the NFC device) may further comprise some other impedance components such as the capacitors $C_N$ and $C_P$ shown in FIG. 6, which are coupled to the antenna matching network and EMI filtering module 130 and are coupled to the switching units $\{S_N(j)\}$ and $\{S_P(k)\}$ through the set of card terminals CardN and CardP of the chip 110-2, respectively. For brevity, similar descriptions for this embodiment are not repeated in detail here.

Figure 7:
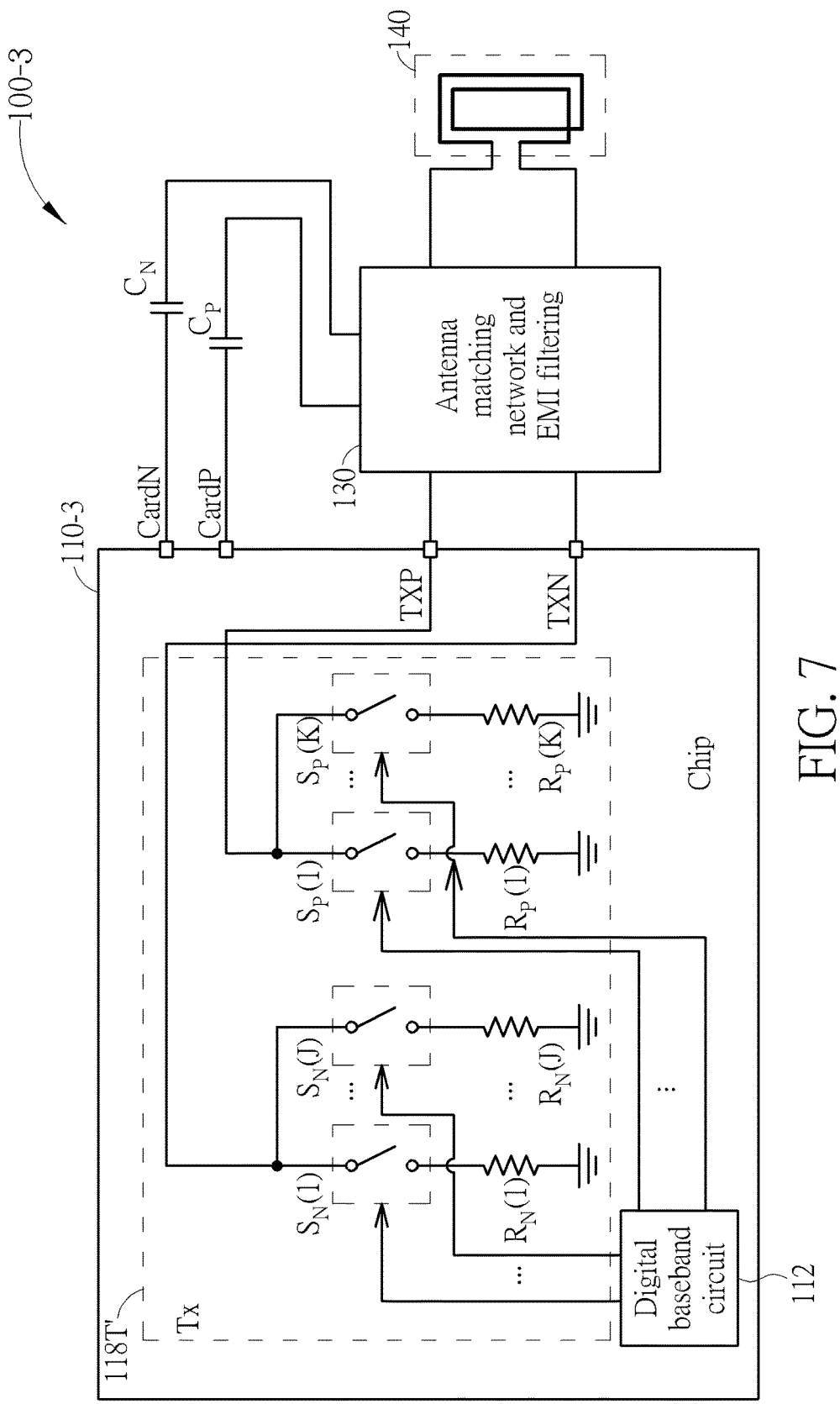
FIG. 7 illustrates some implementation details of the apparatus shown in FIG. 3 according to an embodiment of the present invention.

FIG. 7 illustrates some implementation details of the apparatus 100-3 shown in FIG. 3 according to an embodiment of the present invention, where this embodiment is a variation of the embodiment shown in FIG. 5. According to this embodiment, the plurality of switching units such as the switching units $\{S_N(j)\}$ and $\{S_P(k)\}$ and the set of internal resistors such as the internal resistors $\{R_N(j)\}$ and $\{R_P(k)\}$ can be positioned within the transmitter 118T' mentioned above. In addition, the switching units $\{S_N(j)\}$ and $\{S_P(k)\}$ and the internal resistors $\{R_N(j)\}$ and $\{R_P(k)\}$ can be coupled to the antenna matching network and EMI filtering module 130 through the set of transmitter terminals TXN and TXP of the chip 110-3. For brevity, similar descriptions for this embodiment are not repeated in detail here.

Figure 8:
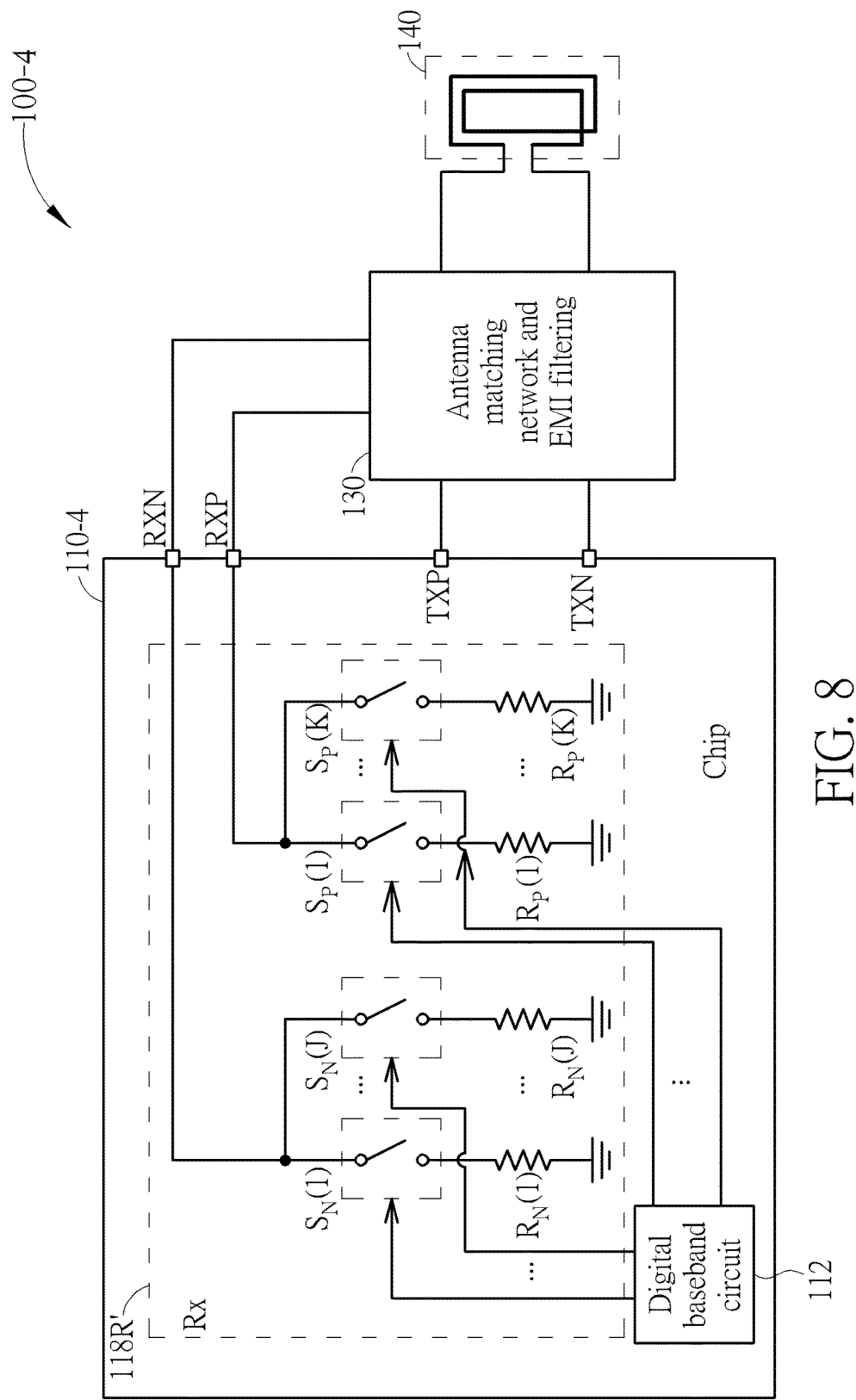
FIG. 8 illustrates some implementation details of the apparatus shown in FIG. 4 according to an embodiment of the present invention.

FIG. 8 illustrates some implementation details of the apparatus 100-4 shown in FIG. 4 according to an embodiment of the present invention, where this embodiment is a variation of the embodiment shown in FIG. 5. According to this embodiment, the plurality of switching units such as the switching units $\{S_N(j)\}$ and $\{S_P(k)\}$ and the set of internal resistors such as the internal resistors $\{R_N(j)\}$ and $\{R_P(k)\}$ can be positioned within the receiver 118R' mentioned above. In addition, the switching units $\{S_N(j)\}$ and $\{S_P(k)\}$ and the internal resistors $\{R_N(j)\}$ and $\{R_P(k)\}$ can be coupled to the antenna matching network and EMI filtering module 130 through the set of receiver terminals RXN and RXP of the chip 110-4. For brevity, similar descriptions for this embodiment are not repeated in detail here.

Figure 9:
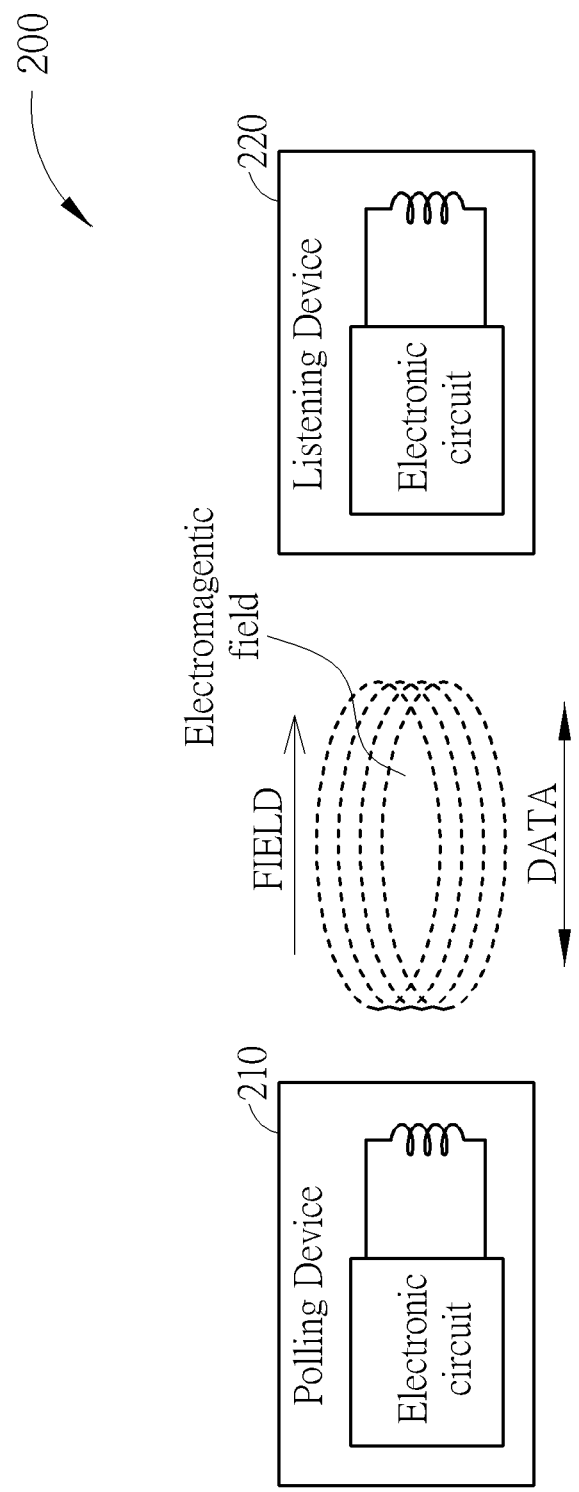
FIG. 9 illustrates an NFC system comprising the aforementioned NFC device of any of the embodiments respectively shown in FIGS. 1-4 according to an embodiment of the present invention.

FIG. 9 illustrates an NFC system 200 comprising the aforementioned NFC device of any of the embodiments respectively shown in FIGS. 1-4 according to an embodiment of the present invention, where the polling device 210 and the listening device 220 may represent two NFC terminals of the NFC system 200. As shown in FIG. 9, the polling device 210 and the listening device 220 may have their own electronic circuits, respectively, and may have their own NFC antennas.

For better comprehension, the listening device 220 can be taken as an example of the NFC device mentioned above, and the polling device 210 can be taken as an example of the other device in the embodiment shown in FIG. 5. According to this embodiment, the NFC system 200 may transmit data in different data rates between the aforementioned two NFC terminals such as the polling device 210 and the listening device 220. For example, the polling device 210 can be an NFC reader and the listening device 220 can be a passive tag or card. As the listening device 220 may need to operate in the absence of battery power, the listening device 220 can be designed to harvest energy from the incoming field (labeled "FIELD" in FIG. 9), and more particularly, the aforementioned electromagnetic field in the embodiment shown in FIG. 5. For the listening device 220, a higher data rate (e.g. a data rate that is higher than any other data rate available) between the polling device 210 and the listening device 220 requires the antenna network quality factor to be lower, while harvesting power from the field requires the antenna network quality factor to be higher.

Please note that the main objective for the aforementioned Q-tuning is to accomplish a higher data rate (such as that mentioned above) without changing the antenna matching network and EMI filtering module 130. Tuning the antenna network quality factor to be greater (e.g. a high Q) is needed for low data rate communication or for proper power harvesting. However, tuning the antenna network quality factor to be smaller (e.g. a low Q) is needed for high data rate communication. In practice, the NFC default communication data rate is typically 106 kilobits per second (kbps), which is typically the lowest data rate, and therefore the default value of the antenna network quality factor is set to be high initially. Based upon the NFC protocol, the first packet of 106 kpbs can be utilized for indicating what data rate is wanted for communicating next. According to this embodiment, each of the apparatus 100-1 shown in FIG. 1, the apparatus 100-2 shown in FIG. 2, the apparatus 100-3 shown in FIG. 3, and the apparatus 100-4 shown in FIG. 4 is capable of using this information to set the antenna network quality factor properly via the aforementioned Q-tuning, where the aforementioned Q-tuning can be performed no matter whether the power comes from the battery or the aforementioned electromagnetic field.

With aid of using any of the architecture shown in FIG. 1, the architecture shown in FIG. 2, the architecture shown in FIG. 3, and the architecture shown in FIG. 4 (more particularly, any of the architecture shown in FIG. 5, the architecture shown in FIG. 6, the architecture shown in FIG. 7, and the architecture shown in FIG. 8), in a situation where the antenna network quality factor can be dynamically adjusted according to the data rate and the current mode of the listening device 220, the related art problems can be resolved. It should be also noted that all embodiments of the present invention are just examples and are not intended to limit our invention. The present invention may operate in either single or differential mode.

Figure 10:
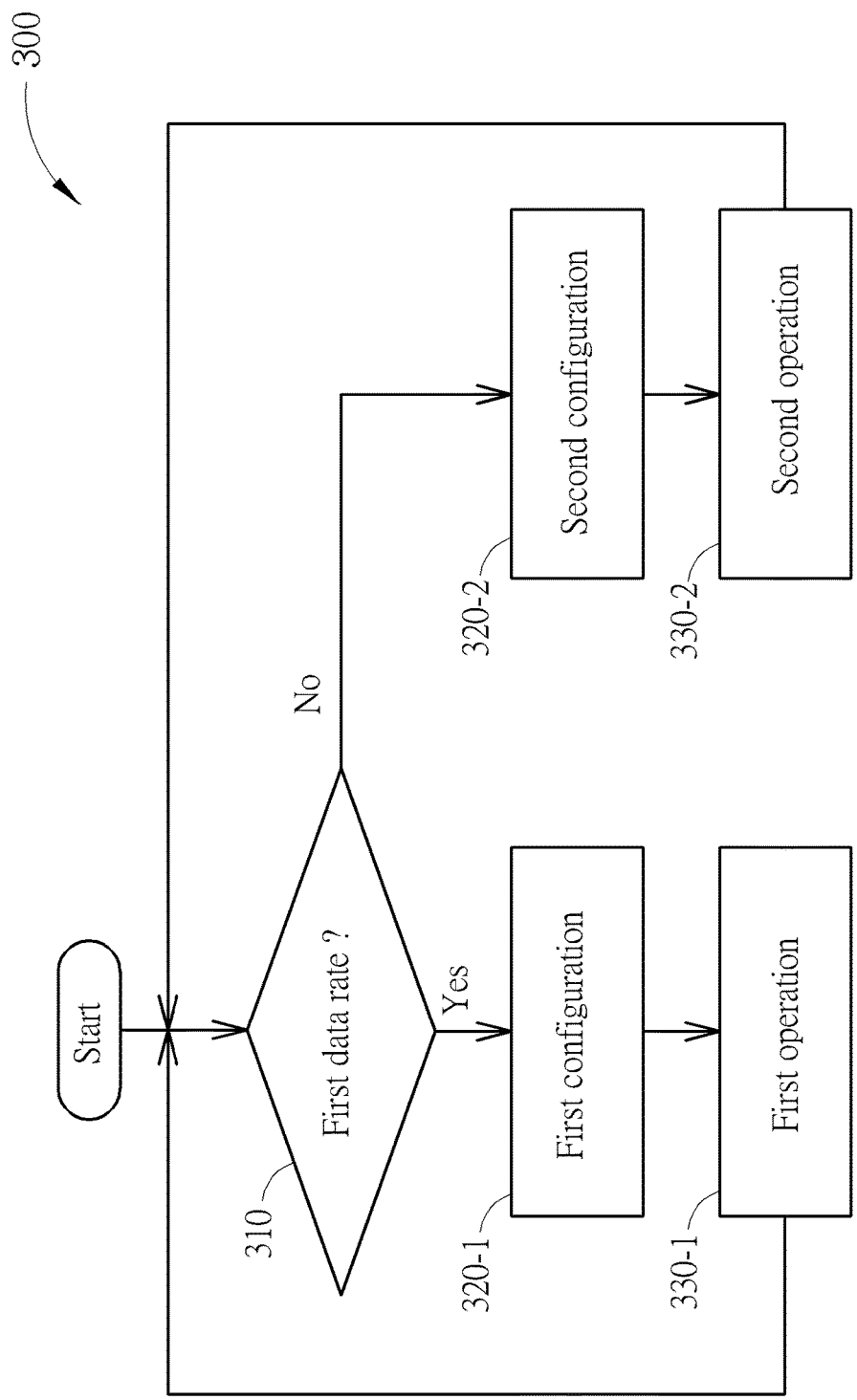
FIG. 10 illustrates a flowchart of a method for controlling an antenna network quality factor of an NFC device according to an embodiment of the present invention.

FIG. 10 illustrates a flowchart of a method 300 for controlling an antenna network quality factor of an NFC device according to an embodiment of the present invention. The method 300 shown in FIG. 10 can be applied to any of the apparatus 100-1 shown in FIG. 1, the apparatus 100-2 shown in FIG. 2, the apparatus 100-3 shown in FIG. 3, and the apparatus 100-4 shown in FIG. 4, and more particularly, can be applied to any of the chip 110-1 shown in FIG. 1, the chip 110-2 shown in FIG. 2, the chip 110-3 shown in FIG. 3, and the chip 110-4 shown in FIG. 4. The method is described as follows.

In Step 310, the digital baseband circuit 112 determines whether a first data rate or a second data rate should be used for data communication during a specific time interval of different time intervals (e.g. a time interval for performing the operation of Step 330-1, or a time interval for performing the operation of Step 330-2). When it is determined that the first data rate should be used for data communication during the specific time interval, Step 320-1 is entered; otherwise, Step 320-2 is entered.

In Step 320-1, the digital baseband circuit 112 controls the set of internal resistors such as the internal resistors $\{R_N(j)\}$ and $\{R_P(k)\}$ to have a first configuration such as that mentioned above during the specific time interval, in order to adjust the antenna network quality factor. More particularly, the digital baseband circuit 112 controls the internal resistors $\{R_N(j)\}$ and $\{R_P(k)\}$ to have the first configuration during the specific time interval (e.g. the aforementioned first time interval), causing the antenna network quality factor of the NFC device to be equivalent to a first value.

In Step 320-2, the digital baseband circuit 112 controls the set of internal resistors such as the internal resistors $\{R_N(j)\}$ and $\{R_P(k)\}$ to have a second configuration such as that mentioned above during the specific time interval, in order to adjust the antenna network quality factor. More particularly, the digital baseband circuit 112 controls the internal resistors $\{R_N(j)\}$ and $\{R_P(k)\}$ to have the second configuration during the specific time interval (e.g. the aforementioned second time interval), causing the antenna network quality factor of the NFC device to be equivalent to a second value. Typically, the second value is different from the first value.

In Step 330-1, under control of the digital baseband circuit 112, the NFC device performs a first operation, such as data transmission using the first data rate.

In Step 330-2, under control of the digital baseband circuit 112, the NFC device performs a second operation, such as data transmission using the second data rate.

According to this embodiment, the digital baseband circuit 112 is capable of setting up two configurations corresponding to low data rate communication and high data rate communication, respectively. This is for illustrative purposes only, and is not meant to be a limitation of the present invention. According to some variations of this embodiment, the number of configurations can be more than two. In practice, the determining operation performed by the digital baseband circuit 112 in Step 310 can be implemented with aid of a storage unit (e.g. a non-volatile memory such as a Flash memory). The digital baseband circuit 112 may store a flag in the storage unit, where a default value of the flag may indicate that the first configuration should be utilized. When needed, the digital baseband circuit 112 may change the flag to another value indicating that another configuration (e.g. the second configuration) should be utilized. For example, the digital baseband circuit 112 may set the flag to be one of a plurality of candidate values corresponding to three or more different configurations (e.g. the first configuration, the second configuration, a third configuration, etc.) for different data rates of data transmission, respectively. More particularly, in addition to the first configuration and the second configuration, the digital baseband circuit 112 is capable of setting up at least one other configuration to adjust the antenna network quality factor, causing the antenna network quality factor of the NFC device to be equivalent to another value (e.g. a value that differs from any of the first value and the second value), where the partial working flows starting from Step 310 toward Step 320-1 and Step 320-2, respectively, can be expanded to be three or more partial working flows corresponding to the aforementioned different data rates of data transmission, respectively. As a result, the digital baseband circuit 112 is capable of setting up different configurations corresponding to three or more different data rates of data transmission, respectively.

According to some variations of this embodiment, one of the first and the second operations can be replaced by an operation of harvesting energy from the electromagnetic field. For example, the first operation can be replaced by the operation of harvesting energy from the electromagnetic field, where Step 310 can be replaced by the operation of checking whether the first configuration should be utilized.

According to some embodiments of the present invention, such as the embodiment shown in FIG. 10 and some variations thereof, the internal resistors $\{R_N(j)\}$ and $\{R_P(k)\}$ are positioned on a plurality of switchable conduction paths between at least one ground terminal of the chip under consideration (e.g. one of the chips 110-1, 110-2, 110-3, and 110-4) and the associated set of terminals of the chip under consideration, respectively, where these switchable conduction paths pass through the internal resistors $\{R_N(j)\}$ and $\{R_P(k)\}$, respectively. In a situation where the method 300 shown in FIG. 10 is applied to the chip 110-1 shown in FIG. 1, the internal resistors $\{R_N(j)\}$ and $\{R_P(k)\}$ are positioned on the switchable conduction paths between the aforementioned at least one ground terminal (e.g. one or more ground terminals of the chip 110-1, such as those illustrated within the chip 110-1 shown in FIG. 5) and the set of stand-alone terminals STN and STP of the chip 110-1, respectively. In a situation where the method 300 shown in FIG. 10 is applied to the chip 110-2 shown in FIG. 2, the internal resistors $\{R_N(j)\}$ and $\{R_P(k)\}$ are positioned on the switchable conduction paths between the aforementioned at least one ground terminal (e.g. one or more ground terminals of the chip 110-2, such as those illustrated within the chip 110-2 shown in FIG. 6) and the set of card terminals CardN and CardP of the chip 110-2, respectively. In a situation where the method 300 shown in FIG. 10 is applied to the chip 110-3 shown in FIG. 3, the internal resistors $\{R_N(j)\}$ and $\{R_P(k)\}$ are positioned on the switchable conduction paths between the aforementioned at least one ground terminal (e.g. one or more ground terminals of the chip 110-3, such as those illustrated within the chip 110-3 shown in FIG. 7) and the set of transmitter terminals TXN and TXP of the chip 110-3, respectively. In a situation where the method 300 shown in FIG. 10 is applied to the chip 110-4 shown in FIG. 4, the internal resistors $\{R_N(j)\}$ and $\{R_P(k)\}$ are positioned on the switchable conduction paths between the aforementioned at least one ground terminal (e.g. one or more ground terminals of the chip 110-4, such as those illustrated within the chip 110-4 shown in FIG. 8) and the set of transmitter terminals RXN and RXP of the chip 110-4, respectively.

For example, in Step 320-1, the switching units $\{S_N(j)\}$ and $\{S_P(k)\}$ can be arranged to selectively enable the switchable conduction paths (which pass through the internal resistors $\{R_N(j)\}$ and $\{R_P(k)\}$), respectively, in order to set up the first configuration. More particularly, under control of the digital baseband circuit 112, one or more of the switching units $\{S_N(j)\}$ and $\{S_P(k)\}$ can be selectively turned on to set up the first configuration. In another example, in Step 320-2, the switching units $\{S_N(j)\}$ and $\{S_P(k)\}$ can be arranged to selectively enable the switchable conduction paths (which pass through the internal resistors $\{R_N(j)\}$ and $\{R_P(k)\}$), respectively, in order to set up the second configuration. More particularly, under control of the digital baseband circuit 112, one or more of the switching units $\{S_N(j)\}$ and $\{S_P(k)\}$ can be selectively turned on to set up the second configuration.

Figure 11:
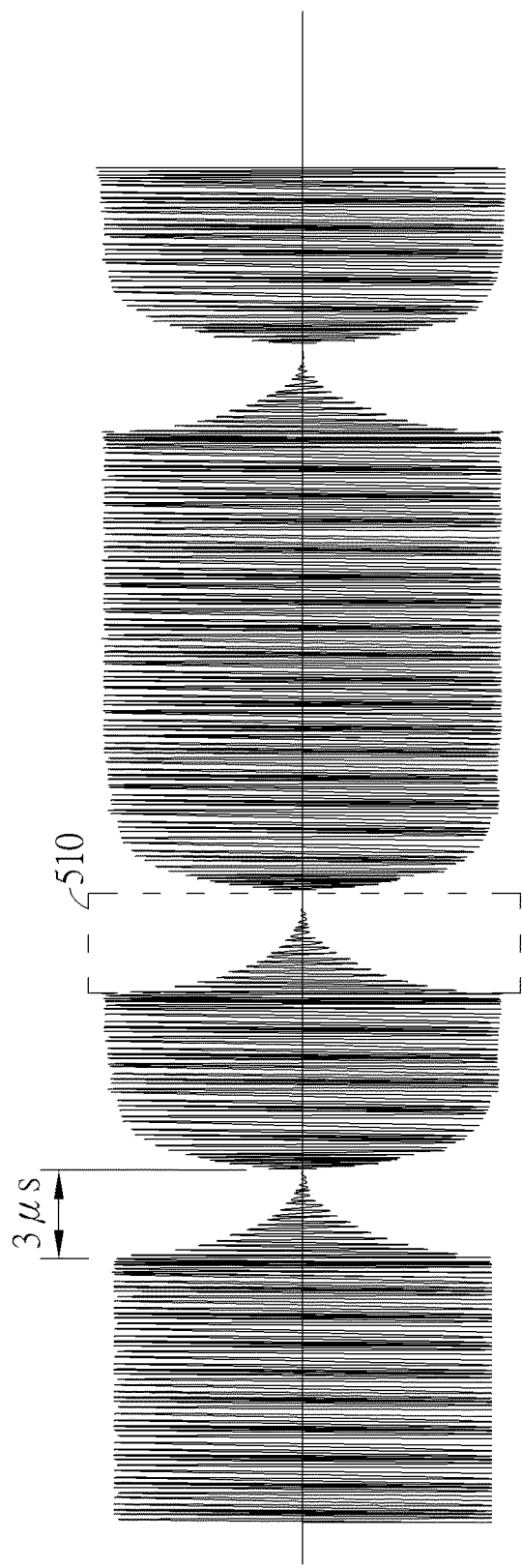
FIG. 11 illustrates an NFC Tx (transmitter) signal involved with the method shown in FIG. 10 according to an embodiment of the present invention.
Figure 12:
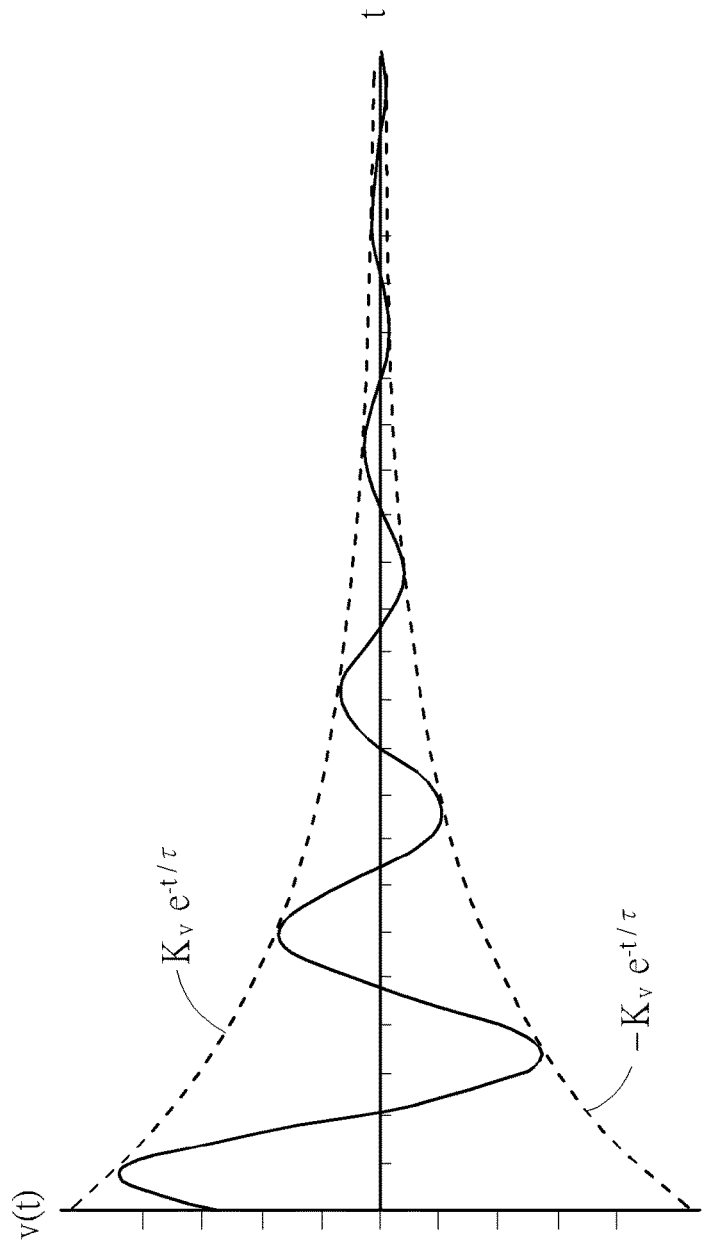
FIG. 12 illustrates details of a portion of the waveform of the NFC Tx signal shown in FIG. 11.
Figure 13:
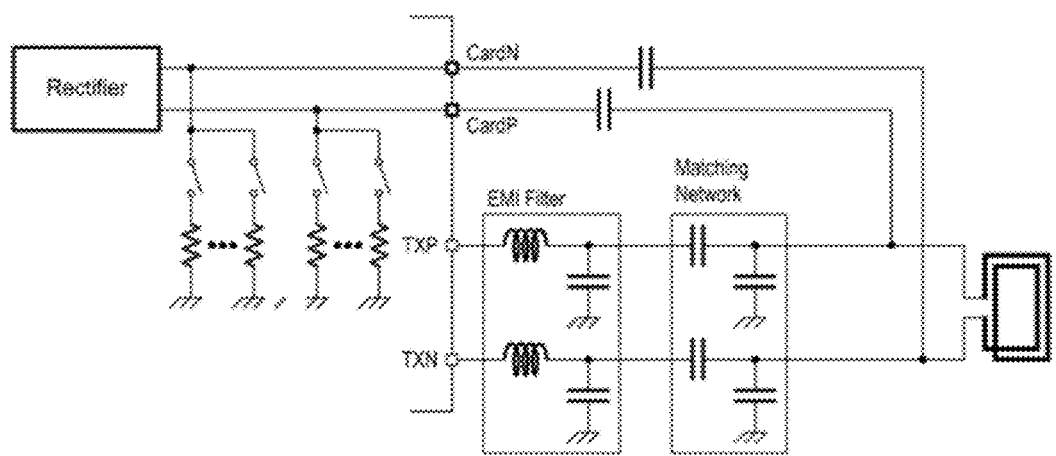
FIG. 13 shows re-configurable on-chip de-Q resistors connected to antenna matching elements.

FIG. 11 illustrates an NFC Tx (transmitter) signal involved with the method 300 shown in FIG. 10 according to an embodiment of the present invention, and FIG. 12 illustrates details of a portion 510 of the waveform of the NFC Tx signal shown in FIG. 11. The curve of the function v(t) represents the modulated signal waveform at the NFC antenna 140, where the notation "t" represents time. The dashed lines shown in FIG. 12 represent the exponentially decayed envelopes of the modulated signal waveform. For example, a pause time $T_{Pause}$ can be equal to 3 microseconds (μs) for 106 kbps amplitude-shift keying (ASK), which means the data rate is equal to 106 kbps and ASK is utilized. More particularly, in a situation where the notation Q represents the aforementioned antenna network quality factor (e.g. the quality factor of the resistor-inductor-capacitor (RLC) network formed with the impedance components of the antenna matching network and EMI filtering module 130, the capacitors $C_N$ and $C_P$, and/or the internal resistors $\{R_N(j)\}$ and $\{R_P(k)\}$) and the notations $\omega_0$ and $\tau$ respectively represent the natural frequency and the associated time constant, the detected voltage v(t) can be expressed as follows:

$$v(t)=1+K_v e^{-t/\tau} \cos(\omega_0 t+\Phi) \quad (1);$$

where $\tau=((2Q)/\omega_0)$ and the coefficient $K_v$ of this embodiment can be a constant. In a situation where the pause time $T_{Pause}$ is greater than $((2\tau)*2)$ (i.e., $T_{Pause}>4\tau$) in order not to violate NFC standard requirements for example, and with the frequency f of the carrier for data transmission typically locates at 13.56 MHz, as $\omega_0=2\pi f$, a limitation of the antenna network quality factor Q for 106 kbps can be written as follows:

$$Q < \frac{T_{Pause}\omega_0}{8} \cong \frac{(3\mu s) \times (2\pi) \times (13.56 \text{ MHz})}{8} \approx 32; \quad (2)$$

where the maximum of the antenna network quality factor Q depends on the ASK data rate because the pause time $T_{Pause}$ is ASK data rate dependent. Please note that the ASK data rate and the pause time $T_{Pause}$ may vary and can be equal to some other values, respectively. For example, for NFC 212 kbps, the pause time $T_{Pause}$ is 1.5 μs, and for 424 kbps, the pause time $T_{Pause}$ is 0.75 μs. The rest may be deduced by analogy. As a result, the maximum allowable antenna Q value decreases with higher data rate, hence the need for adaptive Q tuning.

It is an advantage of the present invention that the present invention method and apparatus can dynamically tune the antenna network quality factor without changing the antenna matching network in the NFC device. In addition, in comparison to the related art, the present invention method and apparatus can reduce the related costs since the number of external components outside the chip is less than that of the conventional NFC device. Additionally, as the antenna network quality factor tuning of the present invention method and apparatus can be performed adaptively, the performance for each data rate can be optimized.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling an antenna network quality factor of a near field communication (NFC) device, the method comprising:
   determining whether a first data rate or a second data rate should be used for data communication during different time intervals, respectively, wherein the first data rate is different from the second data rate; and
   when it is determined that the first data rate should be used for data communication during a first time interval of the time intervals, controlling a set of resistors positioned within a chip of the NFC device to have a first configuration during the first time interval, in order to adjust the antenna network quality factor, wherein the resistors are positioned on a plurality of switchable conduction paths directly connected to at least one ground terminal of the chip, respectively, to allow at least one portion of the resistors being in parallel with an antenna matching network of the NFC device with respect to the at least one ground terminal, wherein the antenna matching network is positioned outside the chip,
   wherein a transmitter within the chip is electrically connected to the antenna matching network outside the chip through transmitter terminals of the chip, wherein electrical paths between the transmitter terminals and the antenna matching network are first electrical paths,
   wherein the switchable conduction paths comprise a first set of switchable conduction paths and a second set of switchable conduction paths, and the first set of switchable conduction paths is electrically connected to a first terminal of an antenna through a first non-transmitter terminal of the chip and the second set of switchable conduction paths is electrically connected to a second terminal of the antenna through a second non-transmitter terminal of the chip,
   wherein a resistor of the first set of switchable conduction paths is in series with a switch, the resistor and switch being connected between the first non-transmitter terminal and the at least one ground terminal,
   wherein an electrical path between the first non-transmitter terminal and the first terminal of the antenna is a second electrical path separate from the first electrical paths,
   wherein an electrical path between the second non-transmitter terminal and the second terminal of the antenna is a third electrical path separate from the first electrical paths, and
   wherein the transmitter terminals and the first and second non-transmitter terminals are boundaries between the chip and the outside of the chip.

2. The method of claim 1, further comprising:
   when it is determined that the second data rate should be used for data communication during a second time interval of the time intervals, controlling the set of resistors to have a second configuration during the second time interval, in order to adjust the antenna network quality factor.

3. The method of claim 2, wherein the second configuration is different from the first configuration.

4. The method of claim 1, wherein the step of controlling the set of resistors positioned within the chip of the NFC device to have the first configuration during the first time interval further comprises:
   when it is determined that the first data rate should be used for data communication during the first time interval of the time intervals, controlling the set of resistors to have the first configuration during the first time interval, causing the antenna network quality factor of the NFC device to be equivalent to a first value.

5. The method of claim 4, further comprising:
   when it is determined that the second data rate should be used for data communication during a second time interval of the time intervals, controlling the set of resistors to have a second configuration during the second time interval, causing the antenna network quality factor of the NFC device to be equivalent to a second value.

6. The method of claim 5, wherein the second value is different from the first value.

7. The method of claim 1, wherein the switchable conduction paths are paths between a rectifier positioned within the chip of the NFC device and at least one ground terminal.

8. The method of claim 7, further comprising: utilizing a plurality of switches positioned within the chip of the NFC device to selectively enable the switchable conduction paths, respectively, in order to set up the first configuration.

9. The method of claim 7, further comprising:
when it is determined that the second data rate should be used for data communication during a second time interval of the time intervals, controlling the set of resistors to have a second configuration during the second time interval, in order to adjust the antenna network quality factor; and
utilizing a plurality of switches positioned within the chip of the NFC device to selectively enable the switchable conduction paths, respectively, in order to set up the second configuration.

10. The method of claim 1, wherein the resistors are internal components of a programmable resistor array positioned within the chip of the NFC device.

11. The method of claim 1, wherein the transmitter terminals correspond to the transmitter, wherein the transmitter is arranged to transmit data for the NFC device.

12. The method of claim 1, wherein the first electrical paths connect to the antenna matching network at one or more locations different from a location at which the second electrical path connects to the antenna matching network.

13. An apparatus for controlling an antenna network quality factor of a near field communication (NFC) device, the apparatus comprising at least one portion of the NFC device, the apparatus comprising:
a set of resistors, positioned within a chip of the NFC device, arranged to perform antenna network quality factor control; and
a control circuit, positioned within the chip of the NFC device and coupled to the set of resistors, arranged to determine whether a first data rate or a second data rate should be used for data communication during different time intervals, respectively, wherein the first data rate is different from the second data rate;
wherein when it is determined that the first data rate should be used for data communication during a first time interval of the time intervals, the control circuit controls the set of resistors to have a first configuration during the first time interval, in order to adjust the antenna network quality factor wherein the resistors are positioned on a plurality of switchable conduction paths directly connected to at least one ground terminal of the chip, respectively, to allow at least one portion of the resistors being in parallel with an antenna matching network on the NFC device with respect to the at least one ground terminal, wherein the antenna matching network is positioned outside the chip,
wherein a transmitter within the chip is electrically connected to the antenna matching network outside the chip through transmitter terminals of the chip, wherein electrical paths between the transmitter terminals and the antenna matching network are first electrical paths, wherein the switchable conduction paths comprise a first set of switchable conduction paths and a second set of switchable conduction paths, and the first set of switchable conduction paths is electrically connected to a first terminal of the antenna outside the chip through a first non-transmitter terminal of the chip and the second set of switchable conduction paths is electrically connected to a second terminal of the antenna through a second non-transmitter terminal of the chip, wherein a resistor of the first set of switchable conduction paths is in series with a switch, the resistor and switch being connected between the first non-transmitter terminal and the at least one ground terminal,
wherein an electrical path between the first non-transmitter terminal and the first terminal of the antenna is a second electrical path separate from the first electrical paths,
wherein an electrical path between the second non-transmitter terminal and the second terminal of the antenna is a third electrical path separate from the first electrical paths, and
wherein the transmitter terminals and the first and second non-transmitter terminals are boundaries between the chip and the outside of the chip.

14. The apparatus of claim 13, wherein when it is determined that the second data rate should be used for data communication during a second time interval of the time intervals, the control circuit controls the set of resistors to have a second configuration during the second time interval, in order to adjust the antenna network quality factor.

15. The apparatus of claim 14, wherein the second configuration is different from the first configuration.

16. The apparatus of claim 13, wherein when it is determined that the first data rate should be used for data communication during the first time interval of the time intervals, the control circuit controls the set of resistors to have the first configuration during the first time interval, causing the antenna network quality factor of the NFC device to be equivalent to a first value.

17. The apparatus of claim 16, wherein when it is determined that the second data rate should be used for data communication during a second time interval of the time intervals, the control circuit controls the set of resistors to have a second configuration during the second time interval, causing the antenna network quality factor of the NFC device to be equivalent to a second value.

18. The apparatus of claim 17, wherein the second value is different from the first value.

19. The apparatus of claim 13, wherein the switchable conduction paths are paths between a rectifier positioned within the chip of the NFC device and at least one ground terminal.

20. The apparatus of claim 19, further comprising: a plurality of switches, positioned within the chip of the NFC device, arranged to selectively enable the switchable conduction paths, respectively, in order to set up the first configuration.

21. The apparatus of claim 19, wherein when it is determined that the second data rate should be used for data communication during a second time interval of the time intervals, the control circuit controls the set of resistors to have a second configuration during the second time interval, in order to adjust the antenna network quality factor; and the apparatus further comprises:
a plurality of switches, positioned within the chip of the NFC device, arranged to selectively enable the switchable conduction paths, respectively, in order to set up the second configuration.

22. The apparatus of claim 13, wherein the resistors are internal components of a programmable resistor array positioned within the chip of the NFC device.

23. The apparatus of claim 22, wherein the apparatus comprises a transceiver and rectifier module, and the transceiver and rectifier module is positioned within the chip of the NFC device; and the transceiver and rectifier module comprises:
the transmitter arranged to transmit data for the NFC device;

a receiver arranged to receive data for the NFC device; and a rectifier arranged to perform rectifying operations for the NFC device, wherein the programmable resistor array is positioned outside the transceiver and rectifier module.

24. The apparatus of claim 22, wherein the apparatus comprises a rectifier, and the rectifier is positioned within the chip of the NFC device; the rectifier is arranged to perform rectifying operations for the NFC device; and the programmable resistor array is integrated into the rectifier.

25. The apparatus of claim 22, wherein the apparatus comprises the transmitter, and the transmitter is arranged to transmit data for the NFC device.

26. The apparatus of claim 22, wherein the apparatus comprises a receiver, and the receiver is positioned within the chip of the NFC device; the receiver is arranged to receive data for the NFC device; and the programmable resistor array is integrated into the receiver.

27. The apparatus of claim 13, wherein the apparatus comprises a transceiver and rectifier module, and the transceiver and rectifier module is positioned within the chip of the NFC device; and the transceiver and rectifier module comprises:

a transmitter arranged to transmit data for the NFC device;

a receiver arranged to receive data for the NFC device; and a rectifier arranged to perform rectifying operations for the NFC device, wherein the resistors are positioned outside the transceiver and rectifier module.

28. The apparatus of claim 13, wherein the apparatus comprises a rectifier, and the rectifier is positioned within the chip of the NFC device; the rectifier is arranged to perform rectifying operations for the NFC device; and the resistors are integrated into the rectifier.

29. The apparatus of claim 13, wherein the apparatus comprises the transmitter, and the transmitter is arranged to transmit data for the NFC device.

30. The apparatus of claim 13, wherein the apparatus comprises a receiver, and the receiver is positioned within the chip of the NFC device; the receiver is arranged to receive data for the NFC device; and the resistors are integrated into the receiver.

31. The apparatus of claim 13, wherein the transmitter terminals correspond to the transmitter, wherein the transmitter is arranged to transmit data for the NFC device.

32. The apparatus of claim 13, wherein the first electrical paths connect to the antenna matching network at one or more locations different from a location at which the second electrical path connects to the antenna matching network.

* * * * *